(12) United States Patent
Tao et al.

(10) Patent No.: US 11,134,180 B2
(45) Date of Patent: Sep. 28, 2021

(54) DETECTION METHOD FOR STATIC IMAGE OF A VIDEO AND TERMINAL, AND COMPUTER-READABLE STORAGE MEDIUM

(71) Applicant: SHENZHEN SKYWORTH-RGB ELECTRONIC CO., LTD., Shenzhen (CN)

(72) Inventors: Zehua Tao, Shenzhen (CN); Mingbin Hong, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/042,106

(22) PCT Filed: Jun. 24, 2020

(86) PCT No.: PCT/CN2020/097930
§ 371 (c)(1),
(2) Date: Sep. 26, 2020

(87) PCT Pub. No.: WO2021/012863
PCT Pub. Date: Jan. 28, 2021

(65) Prior Publication Data
US 2021/0029272 A1 Jan. 28, 2021

(30) Foreign Application Priority Data
Jul. 25, 2019 (CN) .......................... 201910681521.0

(51) Int. Cl.
*H04N 5/14* (2006.01)
*H04N 17/00* (2006.01)
*G06T 7/00* (2017.01)

(52) U.S. Cl.
CPC ............... *H04N 5/147* (2013.01); *G06T 7/97* (2017.01); *H04N 17/00* (2013.01); *G06T 2207/10016* (2013.01)

(58) Field of Classification Search
CPC .......... H04N 5/147; H04N 17/00; G06T 7/97; G06T 2207/10016
See application file for complete search history.

(56) References Cited

U.S. PATENT DOCUMENTS 7,081,906 B2 * 7/2006 Kim ..................... G09G 3/2022
345/63
9,485,501 B2 * 11/2016 Paepe ..................... G09G 3/36
(Continued)

FOREIGN PATENT DOCUMENTS

CN 102402939 A 4/2012
CN 102421008 A 4/2012
(Continued)

OTHER PUBLICATIONS

International Search Report and Written Opinion in corresponding PCT Application No. PCT/CN2020/097930, dated Aug. 28, 2020.
(Continued)

*Primary Examiner* — Brian P Yenke
(74) *Attorney, Agent, or Firm* — Westbridge IP LLC (57) ABSTRACT

Disclosed are a detection method for static image of a video, a detection terminal, and a computer-readable storage medium. The method includes: obtaining a frame image from the video as a reference frame image in a playback order, obtaining an image set comprising n frame images after the reference frame image in the playback order; sequentially determining whether first (n−1) frame images in the currently obtained image set satisfy a preset static image brightness requirement; determining whether a nth frame image in the image set satisfies a preset gray histogram judgment condition; determining whether a stop condition is
(Continued)

satisfied according to the reference frame image and the nth frame image in the currently obtained image set; if the above determination results are yes, determining that a video image including the frame images from the reference frame image to the nth frame image in the current image set is a static image.

16 Claims, 4 Drawing Sheets

(56) References Cited

U.S. PATENT DOCUMENTS

| | | | | |
|---|---|---|---|---|
| 10,467,734 | B2* | 11/2019 | Deng | G06K 9/4652 |
| 10,490,137 | B2* | 11/2019 | Fu | G09G 3/3406 |
| 10,803,350 | B2* | 10/2020 | Ma | G06K 9/6256 |
| 10,878,543 | B2* | 12/2020 | Deng | G06T 5/007 |
| 2003/0210256 | A1* | 11/2003 | Mori | G09G 5/04 345/690 |
| 2005/0212726 | A1* | 9/2005 | Namba | G09G 3/22 345/63 |
| 2007/0127569 | A1* | 6/2007 | Hatalkar | G09G 5/00 375/240.12 |
| 2007/0222711 | A1 | 9/2007 | Kao et al. | |
| 2007/0236410 | A1* | 10/2007 | Shimizu | H04N 3/20 345/20 |
| 2009/0179841 | A1* | 7/2009 | Visser | G09G 3/3406 345/88 |
| 2009/0278857 | A1* | 11/2009 | Wajs | G06T 5/50 345/629 |
| 2010/0265280 | A1 | 10/2010 | Yen et al. | |
| 2015/0130860 | A1* | 5/2015 | Park | G09G 3/3648 345/691 |
| 2015/0187277 | A1* | 7/2015 | Maeyama | G09G 3/3291 345/694 |
| 2019/0080670 | A1* | 3/2019 | Jung | G09G 5/10 |
| 2019/0156726 | A1 | 5/2019 | Chun | |
| 2020/0193904 | A1* | 6/2020 | Kho | G09G 3/3233 |
| 2020/0244841 | A1* | 7/2020 | Ichikawa | G06K 9/00765 |
| 2020/0334847 | A1* | 10/2020 | Du | G06K 9/00973 |
| 2021/0020140 | A1* | 1/2021 | Li | G09G 5/10 |
| 2021/0084198 | A1* | 3/2021 | Chen | H04N 5/21 |
| 2021/0084272 | A1* | 3/2021 | Wei | H04N 9/69 |

FOREIGN PATENT DOCUMENTS

| | | |
|---|---|---|
| CN | 107610060 A | 1/2018 |
| CN | 107665665 A | 2/2018 |
| CN | 108600735 A | 9/2018 |
| CN | 110392305 A | 10/2019 |

OTHER PUBLICATIONS

First Office Action in counterpart Chinese Patent Application 201910681521.0, dated Feb. 3, 2021.

* cited by examiner

DETECTION METHOD FOR STATIC IMAGE OF A VIDEO AND TERMINAL, AND COMPUTER-READABLE STORAGE MEDIUM

CROSS REFERENCE TO RELATED APPLICATIONS

The present disclosure is the National Stage of International Application No. PCT/CN2020/097930, filed on Jun. 24, 2020, which claims the benefit of Chinese Patent Application No. 201910681521.0, filed Jul. 25, 2019 with the National Intellectual Property Administration and entitled "DETECTION METHOD FOR STATIC IMAGE OF A VIDEO AND TERMINAL, AND COMPUTER-READABLE STORAGE MEDIUM", the entirety of which is hereby incorporated herein by reference for all purposes.

TECHNICAL FIELD

The present disclosure relates to the field of terminal display, and more particularly relates to a detection method for static image of a video, a detection terminal, and a computer-readable storage medium.

BACKGROUND

For most display devices, organic light-emitting diode (OLED) screens are currently used. When a static image stays on the OLED screen for a long time, an after-image is produced, which is also commonly called burn-in. Thus, display devices using the OLED screens need to determine whether the input image is static. To solve the problem, in the existing technology, the way by calculating average brightness difference or the way by calculating gray level difference is generally adopted for the determination of the static image. However, the way by calculating average brightness difference has a low accuracy; while the way by calculating gray level difference has a large calculation amount, which requires high performance computing capabilities of devices.

SUMMARY

It is an object of the present disclosure to provide a detection method for static image of a video, a detection terminal, and a computer-readable storage medium, aiming to solve the problem that the existing way for detecting whether the input image is static is performed with low accuracy and large calculation amount.

In one aspect, the present disclosure provides a detection method for static image of a video, including the operations:

obtaining a frame image from the video as a reference frame image in a playback order, and obtaining an image set comprising n frame images after the reference frame image in the playback order;

sequentially determining whether first (n−1) frame images in the currently obtained image set satisfy a preset static image brightness requirement;

in response to the first (n−1) frame images satisfying the preset static image brightness requirement, determining whether a nth frame image in the image set satisfies a preset gray histogram judgment condition;

in response to the nth frame image in the image set satisfying the preset gray histogram judgment condition, determining whether a stop condition is satisfied according to the reference frame image and the nth frame image in the currently obtained image set;

if no, continuing to obtain a next image set comprising n frame images after the currently obtained image set, and return to perform the operation of sequentially determining whether first (n−1) frame images in the currently obtained image set satisfy a preset static image brightness requirement; and if yes, determining that a video image comprising all of the frame images between the reference frame image and the nth frame image in the currently obtained image set is a static image.

In some embodiments, after the operation of sequentially determining whether first (n−1) frame images in the currently obtained image set satisfy a preset static image brightness requirement, the detection method further includes:

in response to an ath frame image in the first (n−1) frame images failing to satisfy the preset static image brightness requirement, updating the reference frame image to an (a+1)th frame image, and return to perform the operation of obtaining an image set comprising n frame images after the reference frame image in the playback order.

In some embodiments, after the operation of determining whether a nth frame image in the image set satisfies a preset gray histogram judgment condition, the method further includes:

in response to the nth frame image in the image set failing to satisfy the preset grayscale histogram judgment condition, updating the reference frame image to the nth frame image, and return to perform the operation of obtaining an image set comprising n frame images after the reference frame image in the playback order.

In some embodiments, the operation of sequentially determining whether first (n−1) frame images in the currently obtained image set satisfy a preset static image brightness requirement includes:

obtaining an average brightness value of the reference frame image, and sequentially selecting each frame image from the first (n−1) frame images in the playback order;

in response to each frame image being selected, obtaining an average brightness value of a currently selected frame image, and determining whether the currently selected frame image satisfies the preset static image brightness requirement according to the average brightness value of the currently selected frame image and the average brightness value of the reference frame image; and if yes, continuing to select a next frame image, until the currently selected frame image is the (n−1)th frame image.

In some embodiments, the operation of determining whether the currently selected frame image satisfies a preset static image brightness requirement according to the average brightness value of the currently selected frame image and the average brightness value of the reference frame image includes:

determining whether a difference between the average brightness value of the currently selected frame image and the average brightness value of the reference frame image is less than a first preset threshold;

if yes, determining that the currently selected frame image satisfies the preset static image brightness requirement; and if no, determining that the currently selected frame image fails to satisfy the preset static image brightness requirement.

In some embodiments, the operation of determining whether a nth frame image in the image set satisfies a preset gray histogram judgment condition includes:

determining whether a difference between values corresponding to each level in a grayscale histogram of the reference frame image and a grayscale histogram of the nth frame image in the image set is less than a second preset threshold;

if yes, determining that the nth frame image in the image set satisfies the preset gray histogram judgment condition; and if no, determining that the nth frame image in the image set fails to satisfy the preset gray histogram judgment condition.

In some embodiments, the operation of determining whether a stop condition is satisfied according to the reference frame image and the nth frame image in the currently obtained image set includes:

determining whether a quantity of frame images from the reference frame image to the nth frame image in the currently obtained image set reaches a preset frame number threshold;

if yes, determining that the stop condition is satisfied; and
if no, determining that the stop condition is not satisfied.

In some embodiments, the operation of determining whether a stop condition is satisfied according to the reference frame image and the nth frame image in the currently obtained image set includes:

determining whether a total playback duration from the reference frame image to the nth frame image in the currently obtained image set reaches a preset duration threshold;

if yes, determining that the stop condition is satisfied; and
if no, determining that the stop condition is not satisfied.

In another aspect, the present disclosure provides a detection terminal, including: a memory, a processor and a computer program stored in the memory and executable by the processor, the computer program when being executed by the processor performing the operations of the detection method for static image of a video as described above.

In still another aspect, the present disclosure provides a computer-readable storage medium. The computer-readable storage medium stores a computer program when being executed by a processor performing the operations of the detection method for static image of a video as described above.

The present disclosure provides a detection method for static image of a video, a detection terminal, and a computer-readable storage medium. A main solution includes: obtaining a frame image from the video as a reference frame image in a playback order, obtaining an image set comprising n frame images after the reference frame image in the playback order; sequentially determining whether first (n−1) frame images in the currently obtained image set satisfy a preset static image brightness requirement; in response to the first (n−1) frame images satisfying the preset static image brightness requirement, determining whether a nth frame image in the image set satisfies a preset gray histogram judgment condition; in response to the nth frame image in the image set satisfying the preset gray histogram judgment condition, determining whether a stop condition is satisfied according to the reference frame image and the nth frame image in the currently obtained image set; if no, continuing to obtain a next image set comprising n frame images after the currently obtained image set, and return to perform the operation of sequentially determining whether first (n−1) frame images in the currently obtained image set satisfy a preset static image brightness requirement; if yes, determining that a video image including the frame images from the reference frame image to the nth frame image in the currently obtained image set is a static image. In accordance with this, whether the average brightness values of the first (n−1) frame images satisfy the static image requirement is first determined by way of calculating the average brightness difference with a small calculation amount, and whether the grayscale histogram of the nth frame image satisfies the preset condition is then determined by way of calculating the gray value difference with a large calculation amount. The video image is determined to be static only on condition that all the preset conditions are satisfied. This manner comprehensively considers the brightness and the grayscale image, which improves the accuracy when compared to the way of calculating the average brightness difference, and reduces the calculation amount when compared to the way of calculating the gray value difference.

The realizing of the aim, functional characteristics and advantages of the present disclosure are further described in detail with reference to the accompanying drawings and the embodiments.

DETAILED DESCRIPTION OF THE EMBODIMENTS

It will be appreciated that the specific embodiments described herein are merely illustrative of the present disclosure and are not intended to limit the present disclosure.

Figure 1:
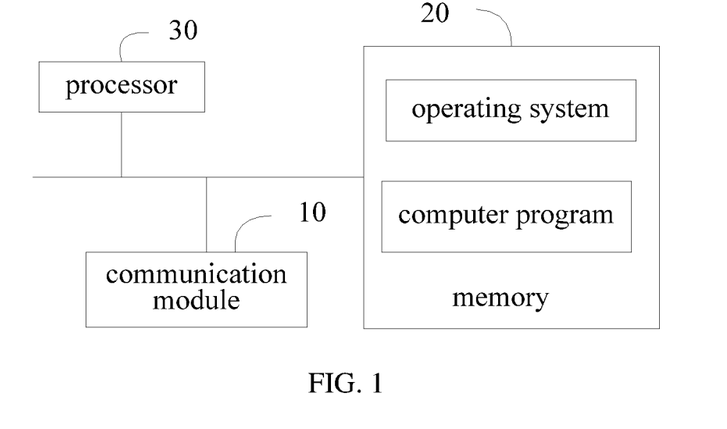
FIG. 1 is a structure diagram of hard operating environment involved in the embodiments according to this disclosure.

Please refer to FIG. 1, FIG. 1 is a structure diagram of a detection terminal provided in the embodiments according to this disclosure. The detection terminal includes a communication module 10, a memory 20, and a processor 30, and so on. It will be appreciated that the detection terminal in FIG. 1 may include more or less components than shown, or combinations of certain components, or different component arrangements. The processor 30 is connected to the memory 20 and the communication module 10, respectively. The memory 20 stores a computer program, and the computer program is executable by the processor 30.

The communication module 10 may be connected to an external device via a network. The communication module 10 can receive data sent by the external device, and can also transmit data, instructions, and information to the external device. The external device may be an electronic device, such as a television, a mobile phone, a tablet computer, a notebook computer, and a desktop computer.

The memory 20 may be configured to store software program and various data. The memory 20 may mainly include a storage program area and a storage data area. The storage program area may store an operating system, an application program required by at least one function (to obtain brightness value of the frame image), etc.; the storage data area may store data or information created according to the use of the detection terminal. In addition, the memory 20 may include a high-speed random access memory, and may also include a non-volatile memory, such as at least one magnetic disk storage device, one flash memory device, or other volatile solid-state storage device.

The processor 30 is the control center of the detection terminal. It is connected to each component of the detection terminal with various interfaces and lines, configured to run or execute software programs and/or modules stored in the memory 20, call the data stored in the memory 20, and perform various functions of the detection terminal and process data, so as to monitor the detection terminal as a whole. The processor 30 may include one or more processing units. Preferably, the processor 30 may integrate an application processor and a modem processor, where the application processor is mainly configured to process the operating system, user interface, and application programs, etc.; the modem is mainly configured to deal with wireless communication. It will be appreciated that the above modem processor may not be integrated into the processor 30.

Although not shown in FIG. 1, the above-described detection terminal may include a circuit control module. The circuit control module is connected to a utility power, so as to ensure normal operation of other components.

It will be appreciated that the structure of the detection terminal shown in FIG. 1 does not constitute a limitation to the detection terminal. It may include more or less components than shown, or a combination of certain components, or different component arrangements.

Based on the above hardware structure, various embodiments according to the present disclosure are provided.

Figure 2:
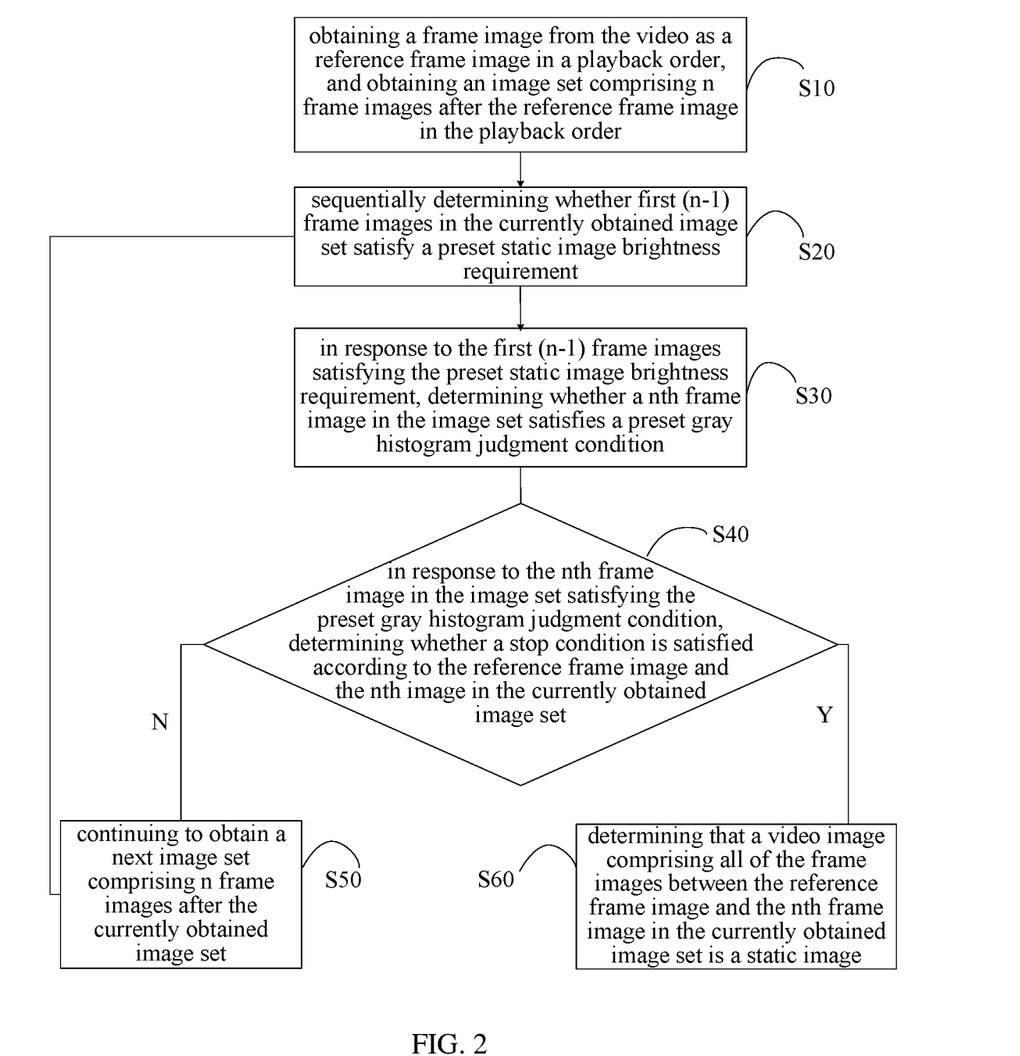
FIG. 2 is an illustrative flowchart of a first embodiment of a detection method for static image of a video according to this disclosure.

Please refer to FIG. 2, a detection method for static image of a video in a first embodiment according to this disclosure includes the steps:

Step S10, obtaining a frame image from the video as a reference frame image in a playback order, and obtaining an image set comprising n frame images after the reference frame image in the playback order.

In this embodiment, the detection terminal obtains video data that is currently being played back on a terminal with a display screen. The terminal with a display screen may be a television, a mobile phone, a tablet computer, a laptop or a desktop computer, etc. The detection terminal may randomly select the frame image, such as, the frame image currently being played back is selected as the reference frame image. Then the detection terminal obtains n frame images after the reference frame image according to the playback order. The obtained n frame images are used as the image set, where the frame images are arranged in the playback order. For example, five frame images are obtained as the image set, where the first frame image in the image set is the first frame image after the reference frame image, and the fifth frame image is the fifth frame image after the reference frame image.

It should be noted that the value of n is greater than or equal to 2. The value of n is related to the number of frames per second of the video currently being played back. The larger the number of frames per second is, the greater the value of n is. In the case of the same number of frames per second, the smaller the value of n is, the more accurate the determination of the static picture is, while the greater the calculation amount is.

Step S20, sequentially determining whether first (n−1) frame images in the currently obtained image set satisfy a preset static image brightness requirement.

According to the playback order, the detection terminal sequentially determines whether the first (n−1) frame images in the image set satisfy the preset static image brightness requirements. A specific process includes:

Step S21, obtaining an average brightness value of the reference frame image, and sequentially selecting each frame image from the first (n−1) frame images in the playback order.

Step S22, in response to each frame image being selected, obtaining an average brightness value of a currently selected frame image, and determining whether the currently selected frame image satisfies the preset static image brightness requirement according to the average brightness value of the currently selected frame image and the average brightness value of the reference frame image; if yes, performing step S23.

A specific determination process may include: calculating the difference between the average brightness value of the currently selected frame image and the average brightness value of the reference frame image; if the difference is less than the first preset threshold, then it is determined that the currently selected frame image satisfies the preset static image brightness requirement; if the difference is greater than or equal to the first preset threshold, then it is determined that the currently selected frame image does not satisfy the preset static image brightness requirement.

Step S23, continuing to select a next frame image, until the currently selected frame image is the (n−1)th frame image.

That is, when the first (n−2) frame images in the image set satisfy the requirement, if the difference between the average brightness value of the (n−1)th frame image and the average brightness value of the reference frame image is less than the first preset threshold, it is determined that the first (n−1) frame images in the image set all satisfy the preset static image brightness requirement.

For example, in a case where there are 4 frame images in the obtained image set, the detection terminal first determines whether the difference between the average brightness value of the first frame image and the average brightness value of the reference frame image is less than the first preset threshold. If the difference between the average brightness value of the first frame image and the average brightness value of the reference frame image is less than the first preset threshold, the detection terminal continues to determine whether the difference between the average brightness value of the second frame image and the average brightness value of the reference frame image is less than the first preset threshold. If the difference between the average brightness value of the second frame image and the average brightness value of the reference frame image is less than the first preset threshold, the detection terminal continues to determine whether the difference between the average brightness value of the third frame image and the average brightness value of the reference frame image is less than the first preset threshold. If the difference between the average brightness value of the third frame image and the average brightness value of the reference frame image is less than the first preset threshold, then it is determined that the first 3 frame images in the image set all satisfy the preset static image brightness requirement.

It will be appreciated that, after determining the reference frame image, the detection terminal may obtain one frame image after the reference frame image in the playback order, and determine whether this one frame image satisfies the static image brightness requirement. If this one frame image satisfies the static image brightness requirement, the detection terminal continues to obtain a next one frame image and then determine whether the next one frame image satisfies the static image brightness requirement, until the (n−1)th frame image is obtained. If the (n−1)th frame image also satisfies the preset static image brightness requirement, it is then determined that the obtained (n−1) frame images all satisfy the static image brightness requirement. The way in which one frame image is determined after this one is obtained may reduce memory usage, when compared to the way in which multiple frame images are obtained at once.

Step S30, in response to the first (n−1) frame images satisfying the preset static image brightness requirement, determining whether a nth frame image in the image set satisfies a preset gray histogram judgment condition.

After determining that the difference between the average brightness value of each of the first (n−1) frame images in the obtained image set and the average brightness value of the reference frame image is less than the first preset threshold, the detection terminal determines whether the nth frame image in the image set satisfies the preset gray histogram judgment condition. A specific process may include:

Step S31, determining whether a difference between values corresponding to each gray level in a grayscale histogram of the reference frame image and a grayscale histogram of the nth frame image in the image set is less than a second preset threshold.

Step S32, if yes, then determining that the nth frame image in the image set satisfies the preset gray histogram judgment condition.

Step S33, if no, then determining that the nth frame image in the image set fails to satisfy the preset gray histogram judgment condition.

The detection terminal first converts the reference frame image and the nth frame image into grayscale images, where the grayscale image may have 32 levels, 256 levels or other levels. It is to first calculate the value corresponding to each gray level in the grayscale histogram of the reference frame image, and the value corresponding to each gray level in the grayscale histogram of the nth frame image, and then calculate the difference between the values corresponding to the each gray level in the two grayscale histograms. If the difference between the values corresponding to each gray level in the two grayscale histograms is less than the second preset threshold, it is determined that the nth frame image in the image set satisfies the preset grayscale histogram judgment condition, and step S40 is continued. If the difference between the values corresponding to any gray level in the two grayscale histograms is greater than or equal to the second preset threshold, it is determined that the nth frame image in the image set does not satisfy the preset gray histogram judgment condition.

For example, the detection terminal converts both the reference frame image and the nth frame image into 32-level grayscale images. According to the gray levels of all pixels in the 32-level grayscale image of the reference frame image and in the 32-level grayscale image of the nth frame image, the detection terminal obtains the 32-level grayscale histogram of the reference frame image and the 32-level grayscale histogram of the nth frame image. In the 32-level grayscale histogram, the value corresponding to each gray level represents the number of pixels belonging to this gray level. The detection terminal then calculates the difference between the values corresponding to each gray level in the 32-level grayscale histogram of the reference frame image and in the 32-level grayscale histogram of the nth frame image. If the values corresponding to the gray levels in the two histograms are all less than the second preset value, it is determined that the nth frame image in the image set satisfies the preset gray histogram judgment condition, and the subsequent step S40 is continued. If the values corresponding to any gray level in the two histograms are greater than or equal to the second preset value, it is determined that the nth frame image in the image set does not satisfy the preset gray histogram judgment condition.

It will be appreciated that when the detection terminal converts the reference image and the nth frame image into grayscale images, the larger the grayscale value of the converted grayscale image is, the more accurate the determination of the static image is, while the larger the calculation amount of the whole process becomes.

Step S40, in response to the nth frame image in the image set satisfying the preset gray histogram judgment condition, determining whether a stop condition is satisfied according to the reference frame image and the nth frame image in the currently obtained image set; if no, performing step S50; if yes, performing step S60.

After determining that the nth frame image in the image set satisfies the preset gray histogram judgment condition, the detection terminal determines whether the stop condition is satisfied according to the reference frame image and the nth frame image in the currently obtained image set. A specific process may include:

Step S41, determining whether a quantity of frame images from the reference frame image to the nth frame image in the currently obtained image set reaches a preset frame number threshold;

Step S42, if yes, then determining that the stop condition is satisfied.

Step S43, if not, then determining that the stop condition is not satisfied.

In this embodiment, the preset frame number threshold is greater than n+1. The larger the preset frame number threshold is, the more accurate the determination of the static image is, while the larger the calculation amount of the whole process becomes.

The detection terminal determining whether the stop condition is satisfied may be as follows.

Step S44, determining whether a total playback duration from the reference frame image to the nth frame image in the currently obtained image set reaches a preset duration threshold.

Step S45, if yes, then determining that the stop condition is satisfied.

Step S46, if not, then determining that the stop condition is not satisfied.

In this embodiment, the preset duration threshold is greater than a total playback duration of n+1 frame images. The larger the preset duration threshold is, the more accurate the determination of the static image is, while the larger the calculation amount of the whole process becomes.

Step S50, continuing to obtain a next image set comprising n frame images after the currently obtained image set, and returning to perform step S20.

Step S60, determining that a video image comprising all of the frame images from the reference frame image to the nth frame image in the currently obtained image set is a static image.

In response to determining that the stop condition is not satisfied, the detection terminal continues to obtain n frame images after the currently obtained image set as a new image set, and returns to perform step S20. In response to determining that the stop condition is satisfied, the detection terminal determines that the video image including the frame images from the reference image to the nth frame image in the currently obtained image set (including the reference frame image and the nth frame image) is a static image.

In this embodiment, the method includes: obtaining a frame image from the video as a reference frame image in a playback order, obtaining an image set comprising n frame images after the reference frame image in the playback order; sequentially determining whether first (n−1) frame images in the currently obtained image set satisfy a preset static image brightness requirement; in response to the first (n−1) frame images satisfying the preset static image brightness requirement, determining whether a nth frame image in the image set satisfies a preset gray histogram judgment condition; in response to the nth frame image in the image set satisfying the preset gray histogram judgment condition, determining whether a stop condition is satisfied according to the reference frame image and the nth frame image in the currently obtained image set; if no, continuing to obtain a next image set comprising n frame images after the currently obtained image set, and return to perform the operation of sequentially determining whether first (n−1) frame images in the currently obtained image set satisfy a preset static image brightness requirement; if yes, determining that a video image including the frame images from the reference frame image to the nth frame image in the currently obtained image set is a static image. In accordance with this, whether the average brightness values of the first (n−1) frame images satisfy the static image requirement is first determined by way of calculating the average brightness difference with a small calculation amount, and whether the grayscale histogram of the nth frame image satisfies the preset condition is then determined by way of calculating the gray level difference with a large calculation amount. The video image is determined to be static only on condition that all the preset conditions are satisfied. This manner comprehensively considers the brightness and the grayscale image, which improves the accuracy when compared to the way of calculating the average brightness difference, and reduces the calculation amount when compared to the way of calculating the gray level difference.

Figure 3:
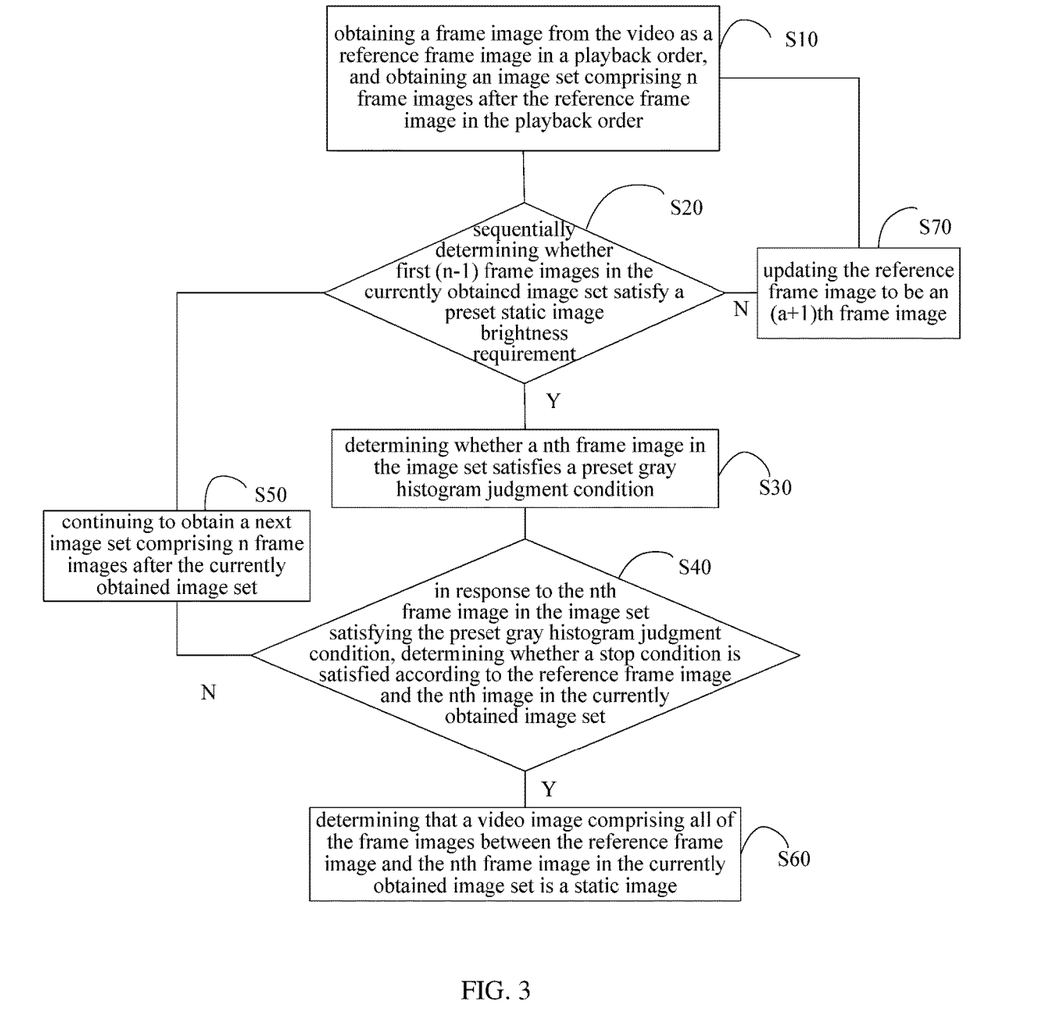
FIG. 3 is an illustrative flowchart of a second embodiment of a detection method for static image of a video according to this disclosure.

Further, referring to FIG. 3, based on the first embodiment, a second embodiment of the method is provided. In this embodiment, if in step S20 it is determined that an ath frame image in the first (n−1) frame images does not satisfy the preset static image brightness requirement, then step S70 is performed.

Step S70, updating the reference frame image to be the (a+1)th frame image, and returning to perform step S10.

In this embodiment, a=1, 2, 3 . . . , n−1. In response to determining that the ath image in the first n−1 frame images does not satisfy the preset static image brightness requirement, that is, if any frame image in the first n−1 frame images does not satisfy the preset static image brightness requirement, the determination process is stopped. The (a+1)th frame image, namely the next frame image after the frame image that does not satisfy the preset static image brightness requirement, is taken as the reference frame image, and step S10 is returned to.

For example, in a case where there are 5 frame images in the obtained image set, in response to determining that the third frame image does not satisfy the preset static image brightness requirement, the detection terminal skips the determination for the fourth frame image, and determines that the video image including the first 3 frame images is a dynamic image. The detection terminal then uses the fourth frame image as the new reference frame image, and re-determines whether each frame image after the new reference frame image is a static image according to the steps in the above-described detection method.

Figure 4:
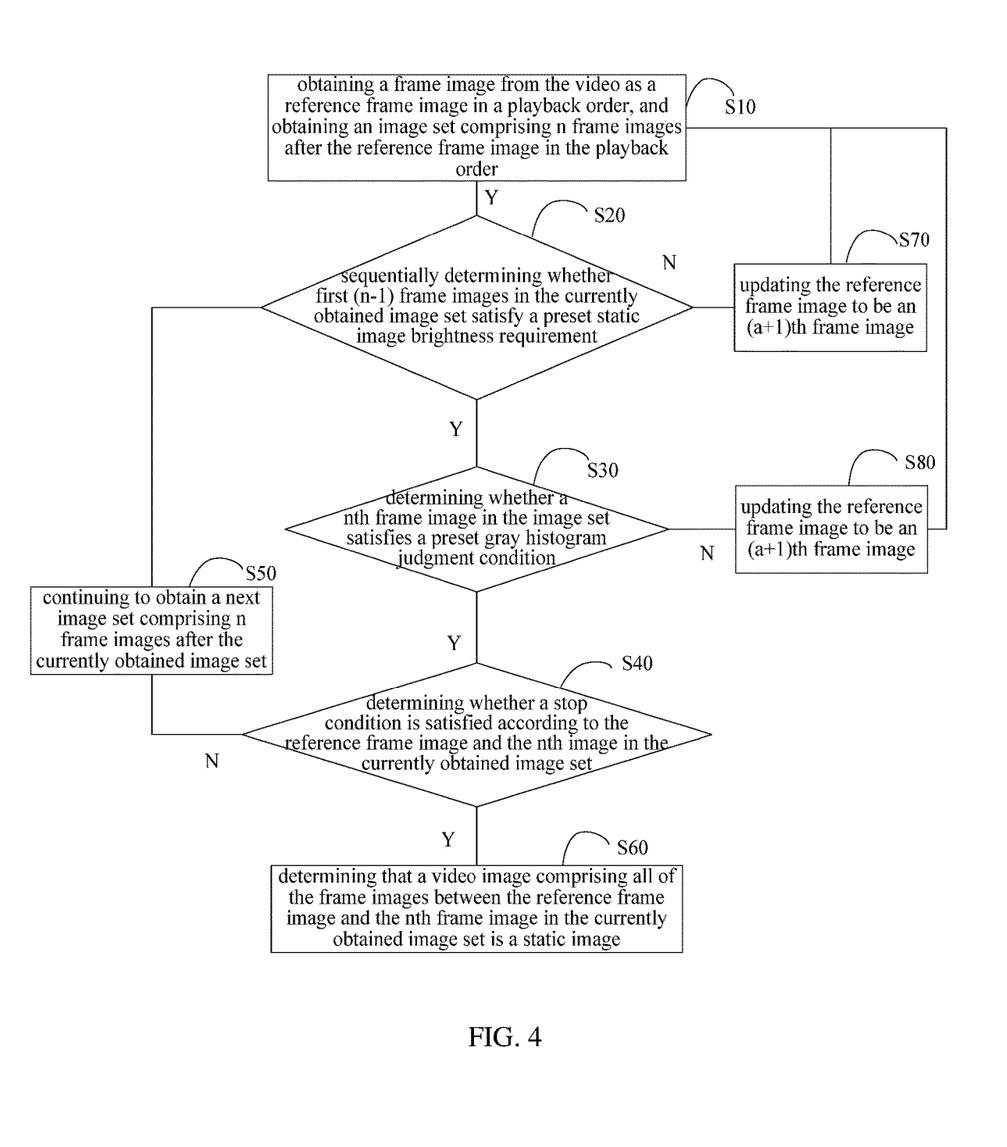
FIG. 4 is an illustrative flowchart of a third embodiment of a detection method for static image of a video according to this disclosure.

Further, referring to FIG. 4, based on the first or second embodiment, a third embodiment of the method is provided. In this embodiment, if the determination result in step S30 is no, then step S80 is performed.

Step S80, updating the reference frame image to be the nth frame image, and returning to perform step S10.

In this embodiment, in response to determining that the value corresponding to any gray level in the 32-level grayscale histogram of the reference frame image and the 32-level grayscale histogram of the nth frame image is greater than or equal to the second preset image, the detection terminal determines that the video image composed of the frame images between the reference frame image and nth frame image in the image set is a static image, and uses the nth frame image as the reference frame image. Then step S10 is returned to, so as to determine whether each frame image after the new reference frame image is a static image.

The present disclosure also provides a computer-readable storage medium, storing a computer program. The computer-readable storage medium may be the memory 20 in the detection terminal shown in FIG. 1, or may be at least one of a Read-Only Memory (ROM)/a Random Access Memory (RAM), a magnetic disk, and an optical disk. The computer-readable storage medium includes pieces of information to enable a server or a television to perform the method described in each embodiment of the present disclosure.

It's to be clarified that the term "include", "comprise" or any other variants thereof is intended to encompass a non-exclusive inclusion, such that a process, method, device, or system including a series of elements not only includes those elements, but also includes other elements that are not explicitly listed, or elements that are inherent to such a process, method, device, or system. In the absence of more restrictions, an element defined by the phrase "including one . . . " does not exclude the existence of additional identical elements in the process, method, device, or system that includes the element.

The numbers of the embodiments according to the present disclosure are merely for description, and do not represent for the advantages and disadvantages of the embodiments.

According to the description of the above-mentioned embodiments, the skilled in the art can clearly understand that the method of embodiments above may be implemented by means of software plus a necessary general hardware platform, of course, also by means of hardware, but in many cases the former is a better implementation.

The foregoing are only illustrative embodiments in accordance with the present disclosure and therefore not intended to limit the patentable scope of the present disclosure. Any equivalent structure or flow transformations that are made taking advantage of the specification and accompanying drawings of the disclosure and any direct or indirect disclosures thereof in other related technical fields are within the protection scope of the present disclosure.

What is claimed is:

1. A detection method for static image of a video, comprising:

obtaining a frame image from the video as a reference frame image in a playback order, and obtaining an image set comprising n frame images after the reference frame image in the playback order;

sequentially determining whether first (n−1) frame images in the currently obtained image set satisfy a preset static image brightness requirement;

in response to the first (n−1) frame images satisfying the preset static image brightness requirement, determining whether a nth frame image in the image set satisfies a preset gray histogram judgment condition;

in response to the nth frame image in the image set satisfying the preset gray histogram judgment condition, determining whether a stop condition is satisfied according to the reference frame image and the nth frame image in the currently obtained image set;

in response to the stop condition failing to be satisfied, continuing to obtain a next image set comprising n frame images after the currently obtained image set, and return to perform the operation of sequentially determining whether first (n−1) frame images in the currently obtained image set satisfy a preset static image brightness requirement; and in response to the stop condition being satisfied, determining that a video image comprising all of the frame images between the reference frame image and the nth frame image in the currently obtained image set is a static image.

2. The detection method according to claim 1, wherein after the operation of sequentially determining whether first (n−1) frame images in the currently obtained image set satisfy a preset static image brightness requirement, the detection method further comprises:

in response to an ath frame image in the first (n−1) frame images failing to satisfy the preset static image brightness requirement, updating the reference frame image to be an (a+1)th frame image, and return to perform the operation of obtaining an image set comprising n frame images after the reference frame image in the playback order.

3. The detection method according to claim 1, wherein after the operation of determining whether a nth frame image in the image set satisfies a preset gray histogram judgment condition, the detection method further comprises:

in response to the nth frame image in the image set failing to satisfy the preset grayscale histogram judgment condition, updating the reference frame image to be the nth frame image, and return to perform the operation of obtaining an image set comprising n frame images after the reference frame image in the playback order.

4. The detection method according to claim 1, wherein the operation of sequentially determining whether first (n−1) frame images in the currently obtained image set satisfy a preset static image brightness requirement comprises:

obtaining an average brightness value of the reference frame image, and sequentially selecting each frame image from the first (n−1) frame images in the playback order;

in response to each frame image being selected, obtaining an average brightness value of a currently selected frame image, and determining whether the currently selected frame image satisfies the preset static image brightness requirement according to the average brightness value of the currently selected frame image and the average brightness value of the reference frame image; and in response to the currently selected frame image satisfying the preset static image brightness requirement, continuing to select a next frame image, until the currently selected frame image is a (n−1)th frame image.

5. The detection method according to claim 2, wherein the operation of sequentially determining whether first (n−1) frame images in the currently obtained image set satisfy a preset static image brightness requirement comprises:

obtaining an average brightness value of the reference frame image, and sequentially selecting each frame image from the first (n−1) frame images in the playback order;

in response to each frame image being selected, obtaining an average brightness value of a currently selected frame image, and determining whether the currently selected frame image satisfies the preset static image brightness requirement according to the average brightness value of the currently selected frame image and the average brightness value of the reference frame image; and in response to the currently selected frame image satisfying the preset static image brightness requirement, continuing to select a next frame image, until the currently selected frame image is a (n−1)th frame image.

6. The detection method according to claim 3, wherein the operation of sequentially determining whether first (n−1) frame images in the currently obtained image set satisfy a preset static image brightness requirement comprises:

obtaining an average brightness value of the reference frame image, and sequentially selecting each frame image from the first (n−1) frame images in the playback order;

in response to each frame image being selected, obtaining an average brightness value of a currently selected frame image, and determining whether the currently selected frame image satisfies the preset static image brightness requirement according to the average brightness value of the currently selected frame image and the average brightness value of the reference frame image; and in response to the currently selected frame image satisfying the preset static image brightness requirement, continuing to select a next frame image, until the currently selected frame image is a (n−1)th frame image.

7. The detection method according to claim 4, wherein the operation of determining whether the currently selected frame image satisfies a preset static image brightness requirement according to the average brightness value of the currently selected frame image and the average brightness value of the reference frame image comprises:

determining whether a difference between the average brightness value of the currently selected frame image and the average brightness value of the reference frame image is less than a first preset threshold;

in response to the difference being less than the first preset threshold, determining that the currently selected frame image satisfies the preset static image brightness requirement; and in response to the difference not being less than the first preset threshold, determining that the currently selected frame image fails to satisfy the preset static image brightness requirement.

8. The detection method according to claim 5, wherein the operation of determining whether the currently selected frame image satisfies a preset static image brightness requirement according to the average brightness value of the currently selected frame image and the average brightness value of the reference frame image comprises:

determining whether a difference between the average brightness value of the currently selected frame image and the average brightness value of the reference frame image is less than a first preset threshold;

in response to the difference being less than the first preset threshold, determining that the currently selected frame image satisfies the preset static image brightness requirement; and in response to the difference not being less than the first preset threshold, determining that the currently selected frame image fails to satisfy the preset static image brightness requirement.

9. The detection method according to claim 6, wherein the operation of determining whether the currently selected frame image satisfies a preset static image brightness requirement according to the average brightness value of the currently selected frame image and the average brightness value of the reference frame image comprises:

determining whether a difference between the average brightness value of the currently selected frame image and the average brightness value of the reference frame image is less than a first preset threshold;

in response to the difference being less than the first preset threshold, determining that the currently selected frame image satisfies the preset static image brightness requirement; and in response to the difference not being less than the first preset threshold, determining that the currently selected frame image fails to satisfy the preset static image brightness requirement.

10. The detection method according to claim 1, wherein the operation of determining whether a nth frame image in the image set satisfies a preset gray histogram judgment condition comprises:

determining whether a difference between values corresponding to each level in a grayscale histogram of the reference frame image and a grayscale histogram of the nth frame image in the image set is less than a second preset threshold;

in response to the difference being less than the second preset threshold, determining that the nth frame image in the image set satisfies the preset gray histogram judgment condition; and in response to the difference not being less than the second preset threshold, determining that the nth frame image in the image set fails to satisfy the preset gray histogram judgment condition.

11. The detection method according to claim 2, wherein the operation of determining whether a nth frame image in the image set satisfies a preset gray histogram judgment condition comprises:

determining whether a difference between values corresponding to each level in a grayscale histogram of the reference frame image and a grayscale histogram of the nth frame image in the image set is less than a second preset threshold;

in response to the difference being less than the second preset threshold, determining that the nth frame image in the image set satisfies the preset gray histogram judgment condition; and in response to the difference not being less than the second preset threshold, determining that the nth frame image in the image set fails to satisfy the preset gray histogram judgment condition.

12. The detection method according to claim 3, wherein the operation of determining whether a nth frame image in the image set satisfies a preset gray histogram judgment condition comprises:

determining whether a difference between values corresponding to each level in a grayscale histogram of the reference frame image and a grayscale histogram of the nth frame image in the image set is less than a second preset threshold;

in response to the difference being less than the second preset threshold, determining that the nth frame image in the image set satisfies the preset gray histogram judgment condition; and in response to the difference not being less than the second preset threshold, determining that the nth frame image in the image set fails to satisfy the preset gray histogram judgment condition.

13. The detection method according to claim 1, wherein the operation of determining whether a stop condition is satisfied according to the reference frame image and the nth frame image in the currently obtained image set comprises:

determining whether a quantity of frame images from the reference frame image to the nth frame image in the currently obtained image set reaches a preset frame number threshold;

in response to the quantity of frame images reaching the preset frame number threshold, determining that the stop condition is satisfied; and in response to the quantity of frame images failing to reach the preset frame number threshold, determining that the stop condition is not satisfied.

14. The detection method according to claim 1, wherein the operation of determining whether a stop condition is satisfied according to the reference frame image and the nth frame image in the currently obtained image set comprises:

determining whether a total playback duration from the reference frame image to the nth frame image in the currently obtained image set reaches a preset duration threshold;

in response to the total playback duration reaching the preset duration threshold, determining that the stop condition is satisfied; and in response to the total playback duration failing to reach the preset duration threshold, determining that the stop condition is not satisfied.

15. A detection terminal, comprising a memory, a processor, and a computer program executable by the processor and stored in the memory, the computer program when being executed by the processor performing the operations of the detection method for static image of a video according to claim 1.

16. A non-transitory computer-readable storage medium, storing a computer program, the computer program when being executed by a processor performing the operations of the detection method for static image of a video according to claim 1.

* * * * *